United States Patent Office 3,527,774
Patented Sept. 8, 1970

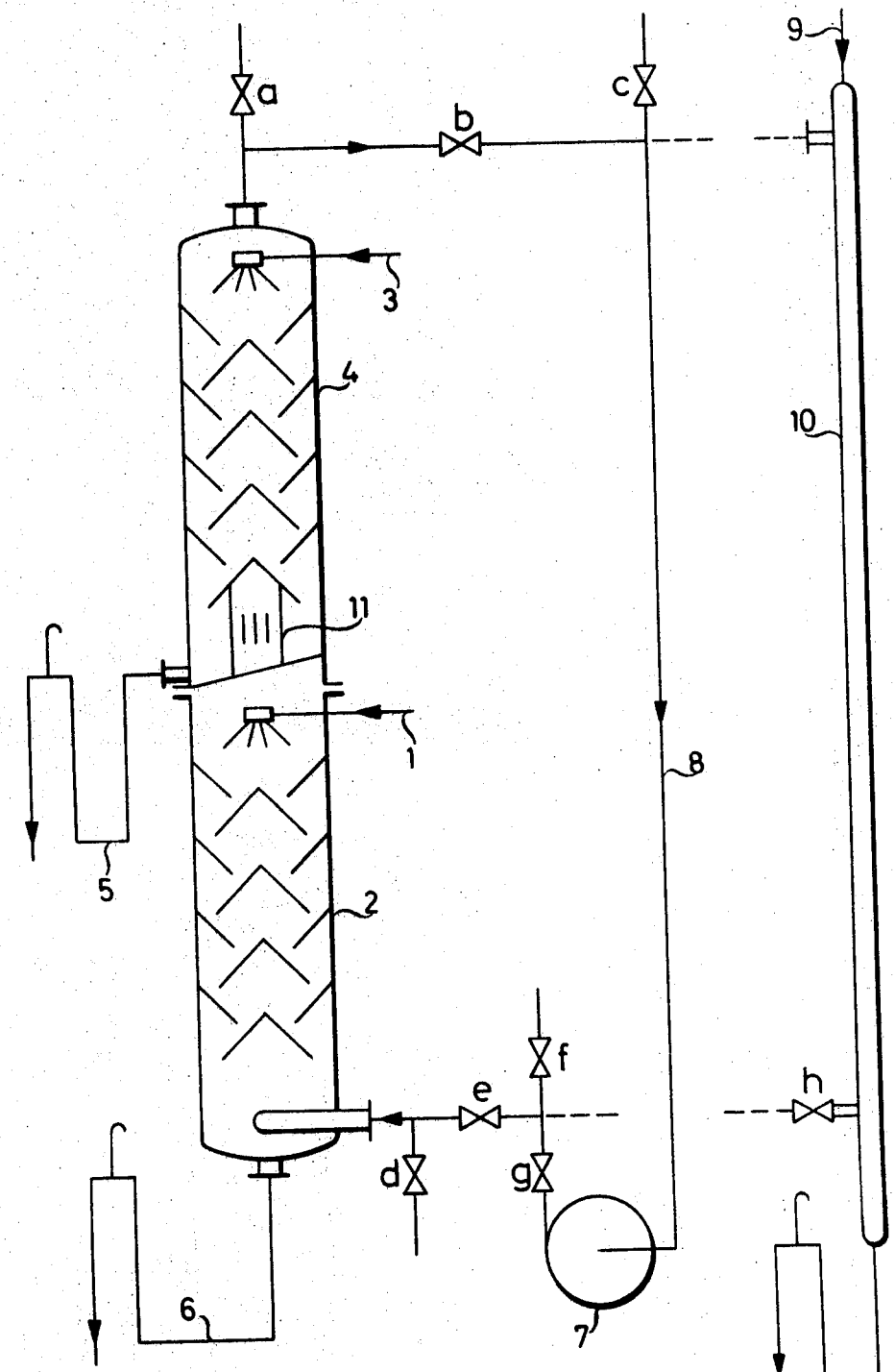

3,527,774
PROCESS FOR UTILIZING THE HEAT OF THE EFFLUENT OF THE SAPONIFICATION DEVICE IN UNITS FOR THE MANUFACTURE OF ALKENE OXIDES ACCORDING TO THE CHLOROHYDRIN PROCESS
Adolf Rothe, Altotting, Hans Herold, Burgkirchen (Alz), and Karl Löschner, Altotting, Germany, assignors to Farbwerke Hoechst Aktiengesellschaft vormals Meister Lucius & Bruning, Frankfurt am Main, Germany, a corporation of Germany
Filed Oct. 4, 1966, Ser. No. 584,258
Claims priority, application Germany, Oct. 28, 1965,
F 47,534
Int. Cl. C07d 1/04, 1/12
U.S. Cl. 260—348.6                                3 Claims

ABSTRACT OF THE DISCLOSURE

The hot effluent from the saponifier in units for the manufacture of alkene oxides according to the chlorohydrin process is contacted in a first exchange chamber with a gas current which is thereby loaded with steam and heated. The steam-loaded and heated gas current then contacts the fresh milk of lime (used for saponifying the chlorohydrin) to heat it up. The carrier gas flows countercurrent to the hot and colder liquids. The gas current contacting the hot liquid is kept under a slight subatmospheric pressure and that contacting the colder liquid is kept under slight superatmospheric pressure. The gas current is washed after it has left the second exchange stage and the wash liquid is also used as operating liquid for maintaining the cycle of the gas current. A suitable device consists of series-connected exchange chambers with inlet and outlets for the hot and colder liquids and cone-shaped inserts forming dropping edges for the liquids. A blower removes gas from the first exchange chamber by suction and discharges it into the second exchange chamber. The washing liquid operates a hydraulic compressor or a liquid jet pump. One exchange chamber is arranged above the other separated by a sleeve with an inclined annular collecting bottom. The tangential outlet slits in the upper section of the sleeve confer a twisting component upon the gas current when it enters the second exchange chamber. The hot as well as the cold liquid are introduced through nozzles at the upper ends of both exchange chambers, which confer upon them a twisting movement in the same direction as the twist of the gas current.

---

The present invention relates to a process for recovering the heat of the effluent of the saponification device in units for the manufacture of alkene oxides according to the chlorohydrin process permitting a more economic operation of the said units. The invention likewise relates to a device especially suitable for carrying out the aforesaid process.

In the manufacture of alkene oxides according to the chlorohydrin process the intermediately formed alkene chlorohydrins are saponified with milk of lime to yield the alkene oxides. The reaction is carried out at about 100° C. and, therefore, not only the used chlorohydrin solution but also the required milk of lime must be heated. This operation requires a considerable amount of steam in an industrial unit.

For saponification, milk of lime made from carbide lime is often used, which milk of lime still contains acetylene and ammonia. In order to remove these impurities to as far an extent as possible steam and air are blown through the milk of lime before it is used in the saponifier. This operation requires also several tons of steam for one ton of alkene oxide.

The calcium chloride-containing dilute milk of lime discharged from the saponifier has a considerable caloric capacity at a temperature of 100 to 102° C., which has not been utilized up to now. The recovery and utilization of these amounts of heat were confronted with serious technical and economic difficulties.

Attempts to heat the fresh milk of lime to be introduced into the saponifiers in heat exchangers with stationary heating surfaces with the aid of the hot saponifier effluent did not succeed. Owing to the high solids content of the liquids, heat exchangers of this type clog very rapidly so that they must be taken out of stream and cleaned at frequent intervals. Attempts to counteract clogging of the heat exchangers by increasing the velocity of flow involve a strong attack of the exchange surfaces by erosion within a short period of time by the minerals contained in the liquid, for example FeSi, coke or quartz. Decanting of the hot used milk of lime would require large and expensive apparatus. Moreover, such a procedure entails considerable losses of heat in a temperature range of from 90 to 100° C., interesting from a thermic point of view.

French Pat. 517,477 provides a process according to which heat is disengaged from a hot liquid by conducting the said liquid in countercurrent flow with a carrier gas which is thereby heated and loaded with steam. The heated gas loaded with steam is then conducted in countercurrent flow with a colder liquid which, in its turn, is heated by taking up heat and steam from the gas.

In order to carry out this process with satisfactory efficiency the liquids must be conducted in the required exchange chambers over installations which repeatedly deflect and distribute the liquid and gas current to bring about an intimate contact. When applying this known process for recovering the heat from the hot effluent from the saponifier in chlorohydrin units serious difficulties had to be overcome. It was to be expected that the cross sectional areas of the flow passage would be rapidly reduced in such exchange chambers by deposits so that operation must be interrupted at short intervals for cleaning purposes. This apprehension mainly results from the conditions in saponifiers of similar construction, in which deposits form on the necesarily plane bottoms between the baffle plates, which deposits are very hard and difficult to remove.

It has now been found that the heat exchange process, in which heat is removed from a hot liquid by means of a carrier gas and the heat is transmitted from the hot carrier gas to a cold liquid, can be used for recovering the heat from the hot effluent from the saponifier in units for the manufacture of alkene oxides according to the chlorohydrin process. The hot effluent from the saponifier is contacted in a first exchange chamber with a gas current which is thereby loaded with steam and heated and the steam-loaded and heated gas current is then contacted with the fresh milk of lime used for saponifying the chlorohydrin whereby the milk of lime is heated up.

The process according to the invention offers the great advantage that there are saved not only considerable amounts of steam for heating the fresh milk of lime but also the amounts of steam for blowing the said fresh milk of lime in order to remove acetylene and ammonia contained therein.

The carrier gas is conducted in countercurrent flow with the hot and the colder liquid. To facilitate saturation of the gas current with steam at the operating temperature and to favor condensation of the steam from the gas current in the colder liquid, it is advantageous to keep the gas current with the hot liquid under a slight subatmospheric pressure and the gas current with the colder liquid under slight superatmospheric pressure. After having passed the colder liquid, the gas may be blown off. If another gas, other than air, is used as carrier gas it is expedient to conduct it in a cycle.

In the present process the gas current is used as carrier for heat and steam and, moreover, for blowing out undesired, volatile constituents in solution. When the gas current is conducted in a cycle, it is advantageous to wash it after it has left the second exchange stage in order to remove the undesired constituents. In this case, the wash liquid can simultaneously be used as operating liquid for maintaining the cycle of the gas current. As washing equipment a jet pump or a hydraulic compressor (falling water compressor) is suitably used.

The device suitable for carrying out the process of the invention consists of an exchange chamber with inlet and outlet for the hot liquid and inlet and outlet for the gas current, an exchanger chamber with inlet and outlet for the colder liquid and inlet and outlet for the gas current, and means for producing and maintaining a gas stream through the two exchanger chambers. The outlet for the gas current from the first exchanger chamber is connected with the inlet for the gas current into the second exchanger chamber.

In order to bring about as intimate a contact as possible of the gas current with the liquid along the countercurrent path in each case, the exchange chambers are provided with inserts forming dropping edges for the liquids. On principle, the inserts may have the shape of bars or the like.

It is especially advantageous to use as inserts upright cones alternating with suspended truncated cones. It is essential that the inserts do not give rise to cloggings of the heat exchanger.

Any appropriate blower can be used for producing and maintaining a gas stream through the two exchanger chambers. The blower can press the gas current through the chambers or it can suck it through. It is especially advantageous to arrange the blower in such a manner that the gas is removed from the first exchange chamber by suction and then pressed into the second exchange chamber.

When the gas is conducted in a cycle, it is expedient to wash it after it has left the second exchange chamber. The washing liquid may be used for operating a hydraulic compressor (falling water compressor) or a liquid jet pump which simultaneously maintains the cycle of the gas through the exchange chambers. In many cases, it is advantageous to connect in series a mechanical blower, for example, a radial or an axial ventilator, with the hydraulic blower.

In order to avoid heat losses the connection between the two exchange chambers should be as short as possible. It has proved particularly advantageous to arrange one exchange chamber above the other and to separate them by a sleeve bottom.

The intercalated sleeve bottom for the passage of the steam-loaded gas current is preferably provided with a single central sleeve closed at the top, the upper section of which has tangential outlet slits. The annular collecting bottom beneath the sleeve is advantageously in inclined position in order to avoid the formation of solid deposits.

By the tangential outlet slits in the upper section of the sleeve closed at the top, a twisting component is conferred upon the gas current when it enters the second exchange chamber. By the tangential introduction of the gas current into the first exchange chamber, the gas ascends in both chambers along a helical line initially having a slight gradient and divides the suspension dropping off the edges on its path upwards.

The hot as well as the cold liquids are introduced through nozzles at the upper end of the respective exchange chamber. It is advantageous to use spraying nozzles with twist conferring upon the introduced liquids a twisting movement in the same direction as the twist of the gas current. By this measure too high a degree of atomization is avoided and the twisting component of the gas current, which gradually diminishes at the upper end of the exchange chambers, is restored again. It results therefrom a solid tangential separating effect preventing liquid droplets from the first exchange chamber from passing into the second exchange chamber.

The accompanying drawing illustrates a device especially suitable for carrying out the process of the invention, which device is composed of two superimposed exchange chambers.

The hot liquid is introduced through a conduit 1 into the lower exchange chamber 2 where it charges with steam according to its tension the gas current arriving from blower 7. The cooled liquid leaves exchange chamber 2 at the bottom through conduit 6. The heated and steam-loaded gas passes through sleeve bottom 11 into the upper exchange chamber 4. The hot steam-air mixture flows in countercurrent with the liquid introduced through conduit 3, whereby the steam is condensed and gives off its heat to the said liquid. The heated liquid leaves the upper exchange chamber by way of a siphon 5. When the gas is to blown off, it escapes through a valve $a$ at the head.

With circulation of the gas, valve $a$ remains closed and the gas is recycled from the head of the device to the suction side of the blower 7 through a valve $b$ and cycle conduit 8.

The device can be operated not only with cycle gas but also by pressing or sucking the gas through the device with appropriate position of valves $a$ to $h$.

When instead of with blower 7 the gas is conveyed with a jet pump or falling water compressor, pipe 8 is replaced by a falling water conduit 10. The falling water is fed at the upper end of conduit 9 and discharged at the lower end through a siphon.

When the device is operated with a falling water system or a jet pump, it is likewise possible to suck or press the gas through the device or to circulate it by correspondingly turning the valves.

When the cycle gas is passed through wash water, the undesired impurities are dissolved in the water and withdrawn from the falling water conduit 10 through a siphon provided at the lower end.

The heat exchanger according to the invention was used for recovering the heat from the effluent of the saponifier of a unit for the manufacture of alkene oxide according to the chlorohydrin process.

The dilute milk of lime containing calcium chloride and leaving the saponifier had a temperature of about 100 to 102° C. and contained large amounts of heat which could not be recovered with conventional heat exchangers for the reasons set forth above.

With the aid of the heat exchanger according to the invention the consumption of steam could be reduced by 2.5 tons for each ton of ethylene oxide. The heat recovered from the hot effluent of the saponifier was used in the second exchange chamber for heating the fresh milk of lime, while simultaneously the impurities contained in the said fresh milk of lime were blown out.

What is claimed is:

1. In the process for the manufacture of alkene oxides from alkene chlorohydrins by saponifying the alkene chlorohydrins with milk of lime the improvement of recovering the heat of the used up hot milk of lime issuing from the saponifier by contacting the said milk of lime with a gas current which is loaded with steam and heated, and then contacting the steam-loaded and heated gas current with fresh milk of lime to be used for saponifying the chlorohydrin whereby the fresh milk of lime is heated.

2. A process according to claim 1, wherein the gas current is simultaneously used for blowing out impurities from the fresh milk of lime and, after having passed the fresh milk of lime, it is subjected to a washing process and recycled for said contacting with used up hot milk of lime.

3. The process claimed in claim 2, wherein the washing liquid is used as operating liquid for maintaining the stream of gas.

No references cited.

NORMA S. MILESTONE, Primary Examiner

U.S. Cl. X.R.

261—22